Feb. 13, 1945. F. P. KERSCHBAUM 2,369,301
PRODUCTION OF CHLORINE
Filed Oct. 13, 1941
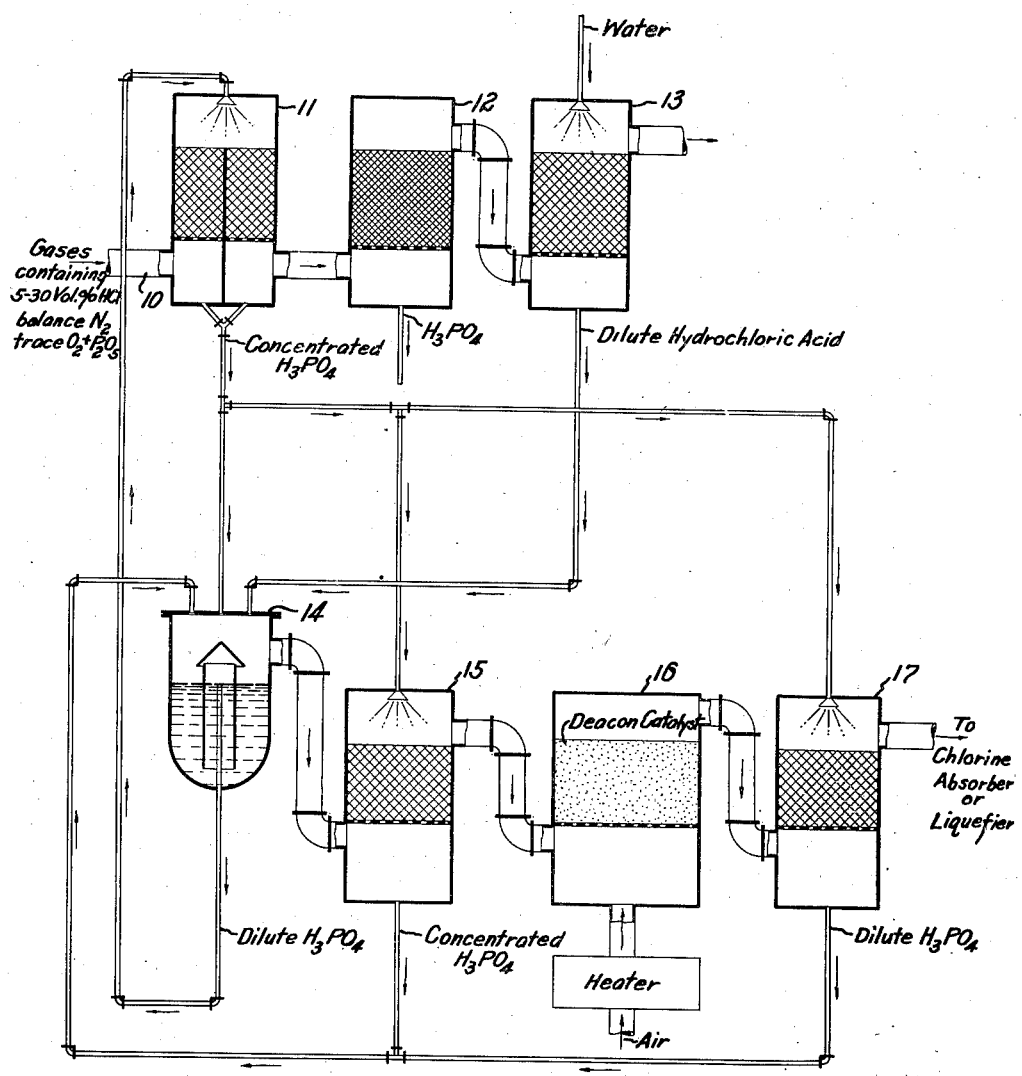
Inventor:
Friedrich P. Kerschbaum
By Pierce & Scheffler
Attorneys.

Patented Feb. 13, 1945

2,369,301

UNITED STATES PATENT OFFICE 2,369,301

PRODUCTION OF CHLORINE

Friedrich P. Kerschbaum, Dayton, Ohio, assignor to Harold T. Stowell, Washington, D. C.

Application October 13, 1941, Serial No. 414,849

4 Claims. (Cl. 23—219)

This invention relates to the production of chlorine and particularly to a method for the conversion of the hydrogen chloride content of gases containing this substance into chlorine.

A principal object of the invention is the provision of an economical and efficient process for the production of chlorine from dilute hydrogen chloride gases, such as the gases obtained by reacting phosphorus oxidation products with alkali or alkaline earth chlorides in the presence of water vapor.

A further object of the invention is the provision of an improved method for the production of chlorine by the so-called Deacon process from dilute hydrogen chloride gases.

A further object of the invention is to provide a method for the concentration of hydrogen chloride from gases containing the same in relatively small proportions, which will not impart to the hydrogen chloride any contaminants injurious to the catalyst used in the oxidation of hydrogen chloride to chlorine.

I have found that the above objects and other objects and advantages may be obtained by a process including the absorption of hydrogen chloride from gaseous mixtures in water, driving the hydrogen chloride out of the aqueous hydrochloric acid solution thus obtained by means of hot concentrated phosphoric acid, mixing the hydrogen chloride with oxygen or an oxygen-containing gas, and passing the mixture into contact with a copper-containing catalyst at a suitable temperature.

The process of the invention is particularly suited for the production of chlorine from the dilute hydrogen chloride-containing gases produced in my thermic process for the production of phosphorus salts as described in U. S. Patents 2,142,943 and 2,142,944, and the invention will be more particularly described for the purpose of illustration as applied to the production of chlorine from such gases.

The accompanying drawing is a diagrammatic representation of a process for the production of chlorine embodying the principles of the invention.

Gases containing, for example, from about 5% to about 30% by volume of HCl with the balance principally nitrogen, and at a temperature of about 600° C., such as are produced in my thermic phosphorus salt process, are introduced into the system at 10. They first pass through phosphoric acid concentration tower 11 advantageously packed with carbon pipes or coarse coke, wherein the heat content of the gases serves to concentrate dilute phosphoric acid from later stages of the process and the gases are cooled, for example, to about 200° C. The gases then pass to mist collecting tower 12 advantageously packed with fine coke wherein substantially all of the finely divided particles of phosphoric acid carried by the gases are removed.

The gases coming from tower 12 at a temperature of, for example, about 180° C., are passed upwardly through absorption tower 13, which may advantageously be packed with coarse coke. A stream of water is supplied to the tower at a rate sufficient to completely absorb the hydrogen chloride contained in the gases, producing a solution of hydrochloric acid containing, for example, 30 to 35% by weight of HCl.

The aqueous hydrochloric acid from absorption tower 13 is fed to hydrogen chloride generator 14, together with hot concentrated phosphoric acid from concentrator and cooling tower 11. In generator 14 the water content of the hydrochloric acid solution is taken up by the phosphoric acid and the hydrogen chloride is given off. The diluted phosphoric acid is returned to concentrator 11. The hydrogen chloride from generator 14 is passed through drying tower 15 which is filled with coarse coke and supplied with a stream of concentrated phosphoric acid. The hydrogen chloride emerges from tower 15 in substantially pure dry form and is passed into oxidation chamber 16, together with an oxygen-containing gas such as air or a mixture of air and oxygen.

In the oxidation chamber the gas mixture is contacted with a suitable catalyst for the oxidation of hydrogen chloride to chlorine under conditions well known in the art. The wet chlorine-containing gases from oxidation chamber 16 are dehydrated by means of a stream of concentrated phosphoric acid in drying tower 17. The rate of flow of the concentrated phosphoric acid may be regulated to remove substantially all the water and unconverted hydrogen chloride from the gas, and the diluted phosphoric acid containing hydrogen chloride and some chlorine is preferably fed to the hydrogen chloride generator 14, whereby the hydrogen chloride and chlorine are returned to the system.

The dry chlorine gas from tower 17 may be passed to any suitable absorption or liquefaction apparatus.

The particular forms of apparatus and conditions of operation described above are purely illustrative and any suitable apparatus or arrangement may be used without departing from the principles of the invention as defined in the appended claims.

I claim:

1. A method of producing chlorine from hot gases containing hydrogen chloride which comprises contacting the hot gases with dilute phosphoric acid to concentrate the phosphoric acid and cool the gases, absorbing hydrogen chloride from the gases in water to form an aqueous solution of hydrochloric acid, contacting the hydrochloric acid solution with the concentrated phosphoric acid to expel hydrogen chloride therefrom, and contacting the expelled hydrogen chloride in the presence of oxygen with a substance capable of catalyzing the oxidation of hydrogen chloride to chlorine.

2. A method of producing chlorine from hot gases containing hydrogen chloride produced by reacting phosphorus oxidation products with alkali or alkaline earth chlorides in the presence of water vapor, which comprises contacting the hot gases with dilute phosphoric acid to concentrate the phosphoric acid and cool the gases, absorbing hydrogen chloride from the gases in water to form an aqueous solution of hydrochloric acid, contacting the hydrochloric acid solution with the concentrated phosphoric acid to expel hydrogen chloride therefrom, and contacting the expelled hydrogen chloride in the presence of oxygen with a substance capable of catalyzing the oxidation of hydrogen chloride to chlorine.

3. A method of producing chlorine from hot gases containing hydrogen chloride produced by reacting phosphorus oxidation products with alkali or alkaline earth chlorides in the presence of water vapor which comprises contacting the hot gases with dilute phosphoric acid to concentrate the phosphoric acid and cool the gases, absorbing hydrogen chloride from the gases in water to form an aqueous solution of hydrochloric acid, contacting the hydrochloric acid solution with the concentrated phosphoric acid to expel hydrogen chloride therefrom, returning the diluted phosphoric acid to the aforesaid contact with the hot gases, and contacting the expelled hydrogen chloride in the presence of oxygen with a substance capable of catalyzing the oxidation of hydrogen chloride to chlorine.

4. A method of producing chlorine from hot gases containing hydrogen chloride produced by reacting phosphorus oxidation products with alkali or alkaline earth chlorides in the presence of water vapor which comprises contacting the hot gases with dilute phosphoric acid to concentrate the phosphoric acid and cool the gases, absorbing hydrogen chloride from the gases in water to form an aqueous solution of hydrochloric acid, contacting the hydrochloric acid solution with the concentrated phosphoric acid to expel hydrogen chloride therefrom, returning the diluted phosphoric acid to the aforesaid contact with the hot gases, contacting the expelled hydrogen chloride in the presence of oxygen with a substance capable of catalyzing the oxidation of hydrogen chloride to chlorine, and removing water from the resulting chlorine-containing gas by contacting the gas with concentrated phosphoric acid.

FRIEDRICH P. KERSCHBAUM.